(12) United States Patent
Prasad et al.

(10) Patent No.: US 12,282,556 B1
(45) Date of Patent: Apr. 22, 2025

(54) COMPUTER-BASED REAL-TIME RELEVANCE SYSTEMS CONFIGURED FOR DOMAIN NAME SEARCH PERSONALIZATION AND METHODS OF USE THEREOF

(71) Applicant: Go Daddy Operating Company, LLC, Tempe, AZ (US)

(72) Inventors: Ankush H. Prasad, Santa Clara, CA (US); Wenbo Wang, Santa Clara, CA (US); Vinit Badrike, Santa Clara, CA (US); Chungwei Yen, Santa Clara, CA (US); David Kellogg, Santa Clara, CA (US); Larry Lai, Santa Clara, CA (US); Anand Krishniyer, Santa Clara, CA (US)

(73) Assignee: Go Daddy Operating Company, LLC, Tempe, AZ (US)

( * ) Notice: Subject to any disclaimer, the term of this patent is extended or adjusted under 35 U.S.C. 154(b) by 0 days.

(21) Appl. No.: 18/952,200

(22) Filed: Nov. 19, 2024

(51) Int. Cl.
*G06F 21/56* (2013.01)
*G06F 16/955* (2019.01)
(Continued)

(52) U.S. Cl.
CPC ........ *G06F 21/566* (2013.01); *G06F 16/9566* (2019.01); *H04L 61/3025* (2013.01);
(Continued)

(58) Field of Classification Search
CPC .... G06F 21/566; G06F 21/55; G06F 16/9566; G06F 16/955; G06F 16/9035; G06F 16/9038; G06F 18/24; H04L 63/14; H04L 63/1441; H04L 63/1408; H04L 61/4511; H04L 63/1433; H04L 63/1483; H04L 41/16; H04L 63/145; H04L 63/1425; H04L 63/1416; H04L 63/0281; G06N 20/00

See application file for complete search history.

(56) References Cited

U.S. PATENT DOCUMENTS

| 2013/0191915 A1* | 7/2013 | Antonakakis | G06F 21/566 726/23 |
| 2016/0065597 A1* | 3/2016 | Nguyen | H04L 63/1441 726/22 |

(Continued)

*Primary Examiner* — Kyung H Shin
(74) *Attorney, Agent, or Firm* — GREENBERG TRAURIG, LLP

(57) ABSTRACT

A method includes receiving a request for a first domain from a requester with an identification, fetching requester profile using the identification, generating a seed domain based on the request and the requester profile, generating a plurality of SLDs based on the seed domain and the requester profile, generating a plurality of TLDs based on the seed domain and the requester profile, generating a first plurality of candidate domains based on the plurality of SLDs and the plurality of TLDs, generating a second plurality of candidate domains that are currently available by checking the first plurality of domains with a domain registrar, ranking the second plurality of candidate domains to be provided to the requester for a selection, receiving a selected domain, automatically updating the requester profile based on the request and the selection, and fetching the updated profile for generating another seed domain for a subsequent request.

20 Claims, 6 Drawing Sheets

(51) Int. Cl.
*H04L 9/40* (2022.01)
*H04L 61/3015* (2022.01)
*H04L 61/4511* (2022.01)
*H04L 61/58* (2022.01)

(52) U.S. Cl.
CPC .......... *H04L 61/4511* (2022.05); *H04L 61/58* (2022.05); *H04L 63/1416* (2013.01); *H04L 63/1433* (2013.01); *H04L 63/1441* (2013.01)

(56) References Cited

U.S. PATENT DOCUMENTS

2017/0026390 A1* 1/2017 Sofka .................. H04L 63/1416
2021/0049226 A1* 2/2021 Zheng ................. G06F 16/9566
2024/0333749 A1* 10/2024 Nabeel ................ H04L 63/1433

* cited by examiner

400 ⤳

| Receive a request for at least one first domain from a requester with an identification     <u>410</u> |

↓

| Fetch requester profile information using the identification, wherein the requester profile information includes a first cached data collected over a first period and a second cached data collected over a second period longer than the first period     <u>420</u> |

↓

| Generate, by executing a first trained machine learning (ML) model, at least one seed domain based at least in part on the request and the requester profile information     <u>430</u> |

↓

| Generate a plurality of suggested domains based on the at least one seed domain     <u>440</u> |

↓

| Provide the plurality of suggested domains to the requester for a selection by the requester     <u>450</u> |

↓

| Receive the selection of at least one selected domain from the plurality of suggested domains     <u>460</u> |

↓

| Automatically update the first cached data in the requester profile information based at least in part on the request and the selection     <u>470</u> |

↓

| Fetch the updated profile information for generating at least another seed domain in response to a subsequent request for at least one second domain     <u>480</u> |

| Generate, by executing a second trained ML model, a plurality of SLDs based at least in part on the at least one seed domain and the requester profile information  510 |

↓

| Generate, by executing a third trained ML model, a plurality of TLDs based at least in part on the at least one seed domain and the requester profile information  520 |

↓

| Generate a first plurality of candidate domains based on the plurality of SLDs and the plurality of TLDs  530 |

↓

| Generate a second plurality of candidate domains by checking the first plurality of domains with at least one domain registrar, wherein the second plurality of candidate domains are currently available domains among the first plurality of candidate domains  540 |

↓

| Rank, by executing a fourth trained ML model, the second plurality of candidate domains into a recommendation order to form the plurality of suggested domains  550 |

FIG. 5

COMPUTER-BASED REAL-TIME RELEVANCE SYSTEMS CONFIGURED FOR DOMAIN NAME SEARCH PERSONALIZATION AND METHODS OF USE THEREOF

FIELD OF TECHNOLOGY

The present disclosure generally relates to the field of internet domain name management, and, more particularly, to computer-based real-time relevance systems configured for domain name search personalization.

BACKGROUND OF TECHNOLOGY

Typically, a domain name is a unique identifier for a website on the internet. Typically, domain name may serve as the address that users type into their web browsers to access a corresponding website. A domain name typically consists of two main parts: second-level domain (SLD) and top-level domain (TLD). SLD is a main part of the domain name, such as "example" in "example.com". TLD is an extension that follows the SLD, such as .com, .org, and .net, etc.

Typically, domain names may be used to identify and locate computers on the internet in a way that is easier to remember than numerical IP addresses. The Domain Name System (DNS) translates domain names into IP addresses, allowing browsers to load the correct website. Domain names are registered through domain registrars, and they need to be renewed periodically to remain active.

Typically, domain search may involve a process of finding information about domain names. A domain name search can include checking the availability of a domain name, retrieving details about the domain's registration, and gathering data on the domain's history and ownership. Domain name search personalization may typically involve obtaining such information as user preferences, geographic location, search history, behavior data, device and context.

Summary of Described Subject Matter

In some aspects, the techniques described herein relate to a method, including: receiving, by a computing device, a request for at least one first domain name from a requester with an identification; fetching, by the computing device, requester profile information using the identification, where the requester profile information includes a first cached data aggregated over a first period of time and a second cached data aggregated over a second period of time longer than the first period of time; generating, by the computing device executing a first trained machine learning (ML) model, at least one seed domain name based at least in part on the request and the requester profile information; generating, by the computing device executing a second trained ML model, a plurality of second-level domains (SLDs) based at least in part on the at least one seed domain name and the requester profile information; generating, by the computing device executing a third trained ML model, a plurality of top-level domains (TLDs) based at least in part on the at least one seed domain name and the requester profile information; generating, by the computing device, a first plurality of candidate domain names based on the plurality of SLDs and the plurality of TLDs; generating, by the computing device, a second plurality of candidate domain names by checking the first plurality of domain names with at least one domain registrar, where the second plurality of candidate domain names are currently available domain names among the first plurality of candidate domain names; ranking, by the computing device executing a fourth trained ML model, the second plurality of candidate domain names into a recommendation order to form a ranked plurality of suggested domain names; providing, by the computing device, the ranked plurality of suggested domain names to the requester for a selection by the requester; receiving, by the computing device, the selection of at least one selected domain name selected from the ranked plurality of suggested domain names; automatically updating, by the computing device, the first cached data in the requester profile information based at least in part on the request and the selection; and fetching, by the computing device, the updated profile information for generating at least another seed domain name in response to a subsequent request for at least one second domain name from the requester.

In some aspects, the techniques described herein relate to a method, where the request includes at least one identifier of the requester.

In some aspects, the techniques described herein relate to a method, where the request includes at least one real-time customer signal including at least one intent, preference and pattern of the requester interacting with a customer search interface.

In some aspects, the techniques described herein relate to a method, where the customer signal is obtained through at least one cookie stored in the customer search interface.

In some aspects, the techniques described herein relate to a method, where the requester profile information includes at least one of: at least one aggregated pattern of search behavior, at least one purchase history listing, and at least one preference of the requester.

In some aspects, the techniques described herein relate to a method, where the requester profile information includes information from comparison of the first cached data and the second cached data.

In some aspects, the techniques described herein relate to a method, further including: fetching, by the computing device, context information; and generating, by the computing device executing a first trained ML model, the at least one seed domain name based at least in part on the context information in addition to the request and the requester profile information.

In some aspects, the techniques described herein relate to a method, where the context information includes information on a continuity of a search session, types of TLDs in a portfolio of the requester and at least one frequently searched TLD.

In some aspects, the techniques described herein relate to a method, further including generating, by the computing device, training dataset form the requester profile information for training the first ML model.

In some aspects, the techniques described herein relate to a method, further including joining, by the computing device, data from a distributed in-memory data store to form the requester profile information.

In some aspects, the techniques described herein relate to a method, further including inserting, by the computing device, at least one advertised domain name in the ranked plurality of suggested domain names.

In some aspects, the techniques described herein relate to a method, further including providing, by the computing device, price information for ranked plurality of suggested domain names.

In some aspects, the techniques described herein relate to a method, further including a public endpoint for receiving the request and for providing the ranked plurality of suggested domain names to the requester.

In some aspects, the techniques described herein relate to a system, including: at least one processor; and at least one memory storing a plurality of computing instructions configured to instruct the at least one processor to: receive a request for at least one first domain name from a requester with an identification; fetch requester profile information using the identification, where the requester profile information includes a first cached data aggregated over a first period of time and a second cached data aggregated over a second period of time longer than the first period of time; generate, by executing a first trained machine learning (ML) model, at least one seed domain name based at least in part on the request and the requester profile information; generate, by executing a second trained ML model, a plurality of second-level domains (SLDs) based at least in part on the at least one seed domain name and the requester profile information; generate, by executing a third trained ML model, a plurality of top-level domains (TLDs) based at least in part on the at least one seed domain name and the requester profile information; generate a first plurality of candidate domain names based on the plurality of SLDs and the plurality of TLDs; generate a second plurality of candidate domain names by checking the first plurality of domain names with at least one domain registrar, where the second plurality of candidate domain names are currently available domain names among the first plurality of candidate domain names; rank, by executing a fourth trained ML model, the second plurality of candidate domain names into a recommendation order to form a ranked plurality of suggested domain names; provide the ranked plurality of suggested domain names to the requester for a selection by the requester; receive the selection of at least one selected domain name selected from the ranked plurality of suggested domain names; automatically update the first cached data in the requester profile information based at least in part on the request and the selection; and fetch the updated profile information for generating at least another seed domain name in response to a subsequent request for at least one second domain name from the requester.

In some aspects, the techniques described herein relate to a system, where the request includes at least one identifier of the requester.

In some aspects, the techniques described herein relate to a system, where the request includes at least one real-time customer signal including at least one intent, preference and pattern of the requester interacting with a customer search interface.

In some aspects, the techniques described herein relate to a system, where the requester profile information includes at least one of: at least one aggregated patterns of search behavior, at least one purchase history listing and at least one preference of the requester.

In some aspects, the techniques described herein relate to a system, where the requester profile information includes information from comparison of the first cached data and the second cached data.

In some aspects, the techniques described herein relate to a system, where the computing instructions are further configured to: fetch context information; and generate, by executing a first trained ML model, the at least one seed domain name based at least in part on the context information in addition to the request and the requester profile information.

In some aspects, the techniques described herein relate to a system, where the context information includes information on a continuity of a search session, types of TLDs in a portfolio of the requester and at least one frequently searched TLD.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIG. 4 is a flowchart illustrating an exemplary real-time relevance process for domain name recommendation in accordance with one or more embodiments of the present disclosure.

FIG. 5 is a flowchart illustrating a subset of the real-time relevance process shown in FIG. 4 in accordance with one or more embodiments of the present disclosure.

DETAILED DESCRIPTION

Figure 1:
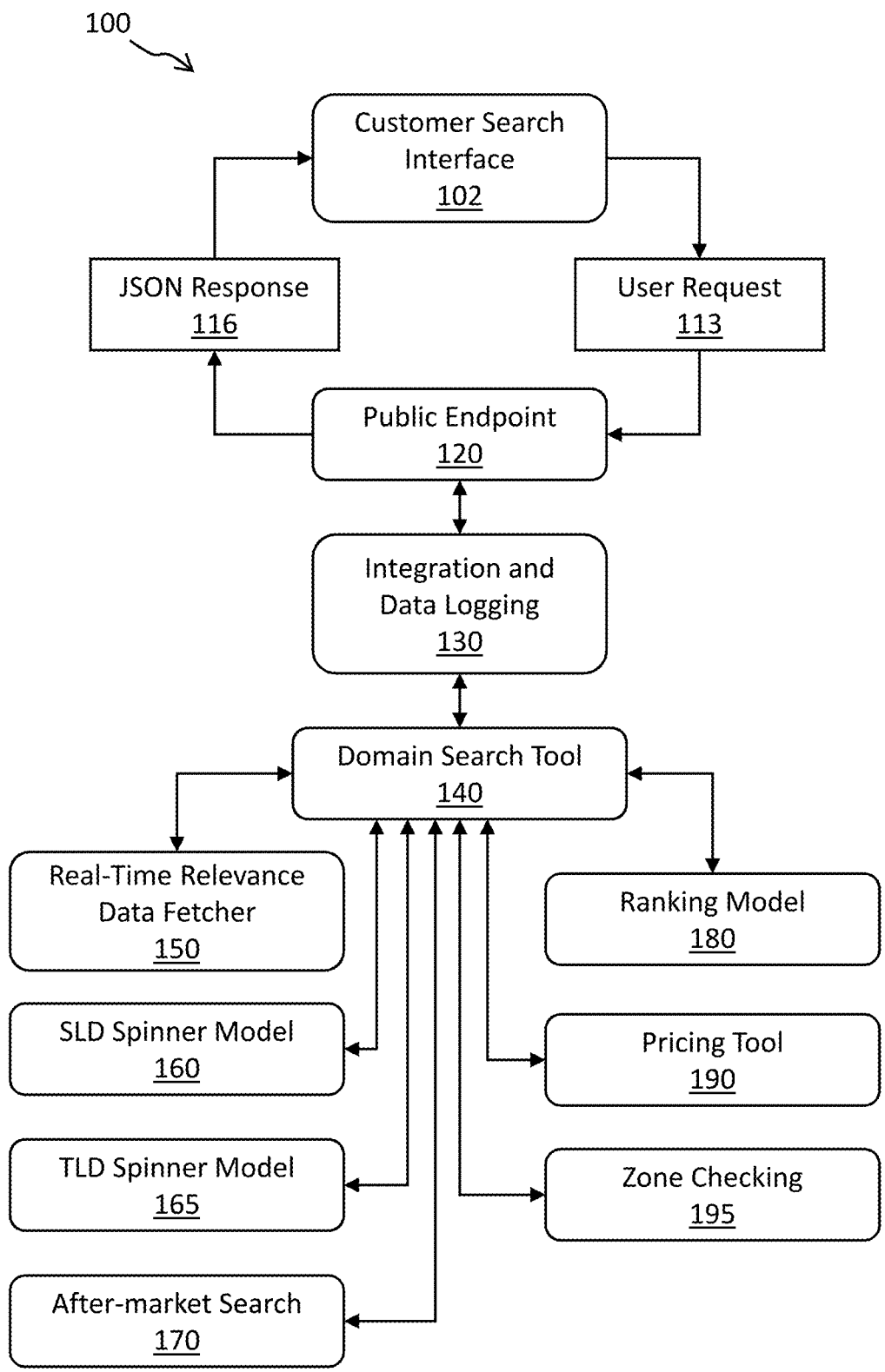
FIG. 1 is a block diagram illustrating an exemplary real-time relevance system for domain name search personalization in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in at least some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

In some embodiments, the present disclosure relates, without limitation, to illustrative real-time relevance systems and accompanying method(s) for domain name search personalization. The real-time relevance systems and accompanying methods dynamically adjust search results based on real-time user behavior. The real-time relevance system and accompanying method have the ability to collect, process and update customer signals in real-time, so that the search models are always working with the fresh data leading to highly relevant domain name suggestions. The real-time relevance system and accompanying method create dynamic customer profiles by comparing data from the last three months with behavioral changes observed over the past 7 days and the current session. This ongoing, real-time customer profiling allows for a highly contextual understanding of customer's needs, thus enabling the system to suggest domain names that are closely aligned with each customer's specific interests and budget. The real-time relevance system and accompanying method also provide contextual understanding of search intent by considering various factors, such as a continuity of search sessions, types of TLDs in a customer's portfolio, and frequently searched TLDs.

The term "customer signal", as used herein generally refers to real-time data points (intent, preference and pattern, etc.) gathered during an active search session. The customer signals capture the immediate actions and intent of the user, such as ongoing searches or preferences in that specific session.

The term, "user profile", as used herein generally refers to comprehensive, long-term collections of customer data built from multiple interactions over time. The user profile may include aggregated patterns of search behavior, purchase history, and user preferences. The user profile may be used to understand and predict future behavior, allowing for highly personalized domain name suggestions. The user profile may continuously evolve with each search session, providing a holistic view of the customer.

While the user profile may represent a long-term, aggregated view of customer behavior, offering deep insights for future recommendations, customer signals may be real-time reflections of immediate actions, allowing the real-time relevance system to response dynamically during an ongoing search session. Together, the user profile and the customer signal work in tandem, with the real-time customer signals updating the user profiles to keep the user profiles relevant and adaptive.

In at least some embodiments, customer signals, user profiles, and context information work together to deliver real-time personalized domain name suggestions. For example, customer signals may be collected from user behaviors, such as searches, domain preferences, and interaction patterns. These customer signals may be processed instantly to ensure recommendations align with live behavior. User profiles may combine historical data (e.g., up to 3 months) and recent activity (e.g., past 7 days and the current session). These user profiles may be continuously updated to reflect evolving customer preferences and behaviors. Context information allows the system to understand patterns within searches, such as repeated queries for similar Second-Level Domains (SLDs) across multiple Top-Level Domains (TLDs). The context information may enable the system to recommend relevant options based on session continuity and broader market trends.

In at least some embodiments, the customer signals, user profiles, and context data may be used both for training a machine learning (ML) model and inferencing therewith. Initially, the ML model may be trained on historical customer data (searches, purchases, and interactions). During real-time sessions, the trained ML model may use these inputs (customer signals, user profiles, and context data) to predict and suggest the most relevant domain names. The ML model may be retrained periodically with fresh data to keep pace with changing behaviors and trends, ensuring that domain name suggestions remain accurate and personalized. This approach may allow real-time relevance system to provide dynamic, highly relevant domain name recommendations that may improve the customer experience and increase domain registration success.

FIG. 1 is a block diagram illustrating an exemplary real-time relevance system 100 for domain name search personalization in accordance with one or more embodiments of the present disclosure. The real-time relevance system 100 may exemplarily include a customer search interface 102, a user request unit 113, a JavaScript Object Notation (JSON) response unit 116, a public endpoint 120, an integration and data logging unit 130, a domain search tool 140, a real-time relevance data fetcher 150, a SLD spinner model 160, a TLD spinner model 165, an aftermarket search 170, a ranking model 180, a pricing tool 190 and a zone checking unit 195.

In at least some embodiments, the customer search interface 102 may be designed to help users find specific domain information quickly and efficiently. The customer search interface 102 may exemplarily include a search bar and a search results display. The search bar is a primary element where a user inputs search queries. The input may be text entered on a keyboard. Alternatively, the input may include voice commands converted into text. In some embodiments, the search bar may employ autocomplete and suggestions as the user types. The search results display presents the search results, such as available domain names, to the user in a clear and organized manner. In some embodiments, the customer search interface 102 is implemented in a mobile device in communication with a server of a domain registration provider over the internet.

In at least some embodiments, the user request unit 113 may collect customer behavior data using three key identifiers: visitor_guid, visit_guid and data points. The visitor_guid may refer to a 1-year cookie stored on the customer's browser, used to track long-term behavior and preferences. The visit_guid may refer to a session cookie identifier exemplarily valid for 20 minutes, capturing customer activity within a single session. The data points may refer to detailed search data such as total searches, TLDs and SLDs searched, domain name availability, and various pricing information (list, current, renewal prices). The above data collection may be done through real-time application programming interface (API) calls.

In at least some embodiments, the JSON response unit 116 translates domain name search results into JSON format, for example, "domains": [{"fqdn": "spizza123.com"}, {"fqdn": "zoespizza123.ai"}]. The term, JSON, as used herein generally refers to a lightweight data-interchange format that is easy for humans to read and write, and easy for machines to parse and generate.

In at least some embodiments, the public endpoint 120 may be specific uniform resource locator (URL) where a web service or API can be accessed by the public. Such access may include the user sending requests and the server responding with the requested data or action. The public endpoint 120 may be exposed to the public, so that the rest endpoints may be better protected.

As shown in FIG. 1, in some embodiments, a customer search query may be received by the customer search interface 102, transmitted to the public endpoint 120 via the user request unit 113. On the other hand, a domain name search result may be transmitted from the public endpoint 120 to the customer search interface 102 via the JSON response unit 116.

In at least some embodiments, the integration and data logging unit 130, connected between the public endpoint 120 and the domain search tool 140, may generates final search results by inserting at least one advertised domain name into search results. The integration and data logging unit 130 also perform data logging for record keeping purpose.

In at least some embodiments, the domain search tool 140 may be a domain analytics and WHOIS research tool, providing detailed information about domain names, registrants, nameservers, and IP addresses. The WHOIS is a query and response protocol used to look up information about the registered users or assignees of an internet resource, such as domain names, IP address blocks, and autonomous systems. WHOIS essentially acts like a directory, providing details about who owns a domain name and how to contact them. The WHOIS database is maintained by the Internet Corporation for Assigned Names and Numbers (ICANN). The domain search tool 140 also offers a variety of tools, including live and historical domain ownership records, website snapshots, ISP and DNS historical hosting records, and reverse lookup tools. In an example, the domain search tool 140 may be implemented with DomainIQ™.

In at least some embodiments, the real-time relevance system enhances the domain search tool 140 by capturing customer signals, including search behavior and intent, and using these inputs to refine the ranking of domain name suggestions generated by the deep learning model of the domain search tool 140. While the domain search tool 140 may generate an initial list of domain name suggestions based on a customer query, the real-time relevance system may process real-time customer data (e.g., preferences for specific TLDs like .com over .net) and help to re-rank and post-process the suggestions to better match the user's preferences. For instance, a customer primarily interested in .com domains will see fewer .net options, improving relevance and customer experience. In this way, the real-time relevance system may optimize the output of the domain search tool 140, ensuring the most relevant suggestions are presented based on individual customer profiles and session activity.

As shown in FIG. 1, in some embodiments, each of the real-time relevance data fetcher 150, the SLD spinner model 160, the TLD spinner model 165, the after-market search 170, the ranking model 180, the pricing tool 190 and the zone checking unit 195 may be connected with the domain search tool 140 and enhance the output of the domain search tool 140 in each unique way as described hereinbelow.

In at least some embodiments, the real-time relevance data fetcher 150 may be an endpoint that retrieves real time signals and returns enjoined real time signals to the domain search tool 140 for consumptions thereby.

In at least some embodiments, the SLD spinner model 160 may be a deep learning model that suggests a list of SLDs that may be relevant to the customer search. For example, for a search query "david book", the SLD spinner model 160 may generate: "david books", "book by david", and "book from david".

In at least some embodiments, the TLD spinner model 165 may be a deep learning model that suggests a list of TLDs that may be relevant to the customer search. For example, for a search query "David book", the TLD spinner model 165 may generate: .com, .net and .org, etc.

In at least some embodiments, the after-market search 170 may function as a secondary marketplace where users can buy and sell domain names that are already registered by someone else. These domains may include expired ones that were not renewed by previous owners of the domain name, and become available for new buyers aft a grace period. These domain names may also include premium ones that are already registered but are available for sale at a higher price. The premium domain names often contain popular keywords, are short, or have valuable word combination.

In at least some embodiment, the ranking model 180 may be a deep learning ranking model that ranks domain search results according to their relevancy to the search query. The real-time relevance system may use a conventional ranking system as a testbed at a starting point for testing and fine-tuning. The conventional ranking system may process and rank domain name suggestions based on a set of predefined criteria, such as domain popularity, availability, and customer preferences. By using the conventional ranking system as a testbed, the real-time relevance system may introduce the real-time personalization capabilities within a familiar and proven ranking environment. By comparing the outputs from both the conventional ranking system and the real-time relevance system, the impact of real-time signals and dynamic customer profiling on domain name ranking and relevance to customer's query may be measured. In some embodiments, the real-time relevance system's real-time relevance features, capturing customer intent, search behavior, and preferences can be gradually integrated into an established ranking system.

In at least some embodiments, the pricing tool 190 may provide a price for every domain name in the search result. The cost of a domain name can vary widely based on several factors, including the domain registrar, the chosen TLD and whether the domain is new or already registered.

In at least some embodiments, the zone checking unit 195 can check DNS zone of a domain name. The DNS zone is a distinct portion of the domain name system (DNS) namespace that is managed by a specific organization or administrator. The DNS allows for more granular control over the DNS components, such as authoritative nameservers. The DNS zone may provide a way to manage a segment of the DNS namespace, enabling administrators to control DNS settings and records for that specific portion. Each DNS zone contains various resource records, such as A records (which map domain names to IP addresses), MX records (which specify mail servers), and CNAME records (which create aliases for domain names). There may be different types of DNS zones, including forward zones (which map domain names to IP addresses) and reverse zones (which map IP addresses to domain names). The information within a DNS zone may be stored in a zone file, which may include all the resource records for that zone.

In at least some embodiments, the real-time relevance system may output a highly personalized and ranked list of domain name suggestions that may be tailored based on the customer's real-time behavior, preferences, and search intent, to the customer search interface 102. The real-time relevance system may continuously refine domain name suggestions to ensure that the suggestions align with the customer's specific needs, such as a preference for certain TLDs or SLDs.

In at least some embodiments, the real-time relevance system may infer customer intent from customer actions. For instance, if a customer adds certain TLDs, SLDs or premium-priced domain names to the shopping cart in the customer search interface 102, the real-time relevance system may capture and incorporate this data to enhance future suggestions. The real-time relevance system may also considers how many premium or advertised domain names have been carted or purchased by the customer, the customer's price sensitivity, and the customer's interest in specific price points. The real-time relevance system may also factor in customer preferences for domain name length, such as shorter domain names, and past transaction sizes, which might influence pricing recommendations or targeted offers.

In at least some embodiments, the real-time relevance may additionally analyze the tokens and keywords the customer is searching for, along with their frequency of use, and the TLDs they repeatedly search. This analysis may help to identify patterns in the customer's search behavior, allowing the real-time relevance system to better anticipate the customer's needs. By continuously processing the real-time customer signals, the real-time relevance system may ensure the final output may be highly relevant, improving both customer satisfaction and the likelihood of domain name purchases.

Figure 2:
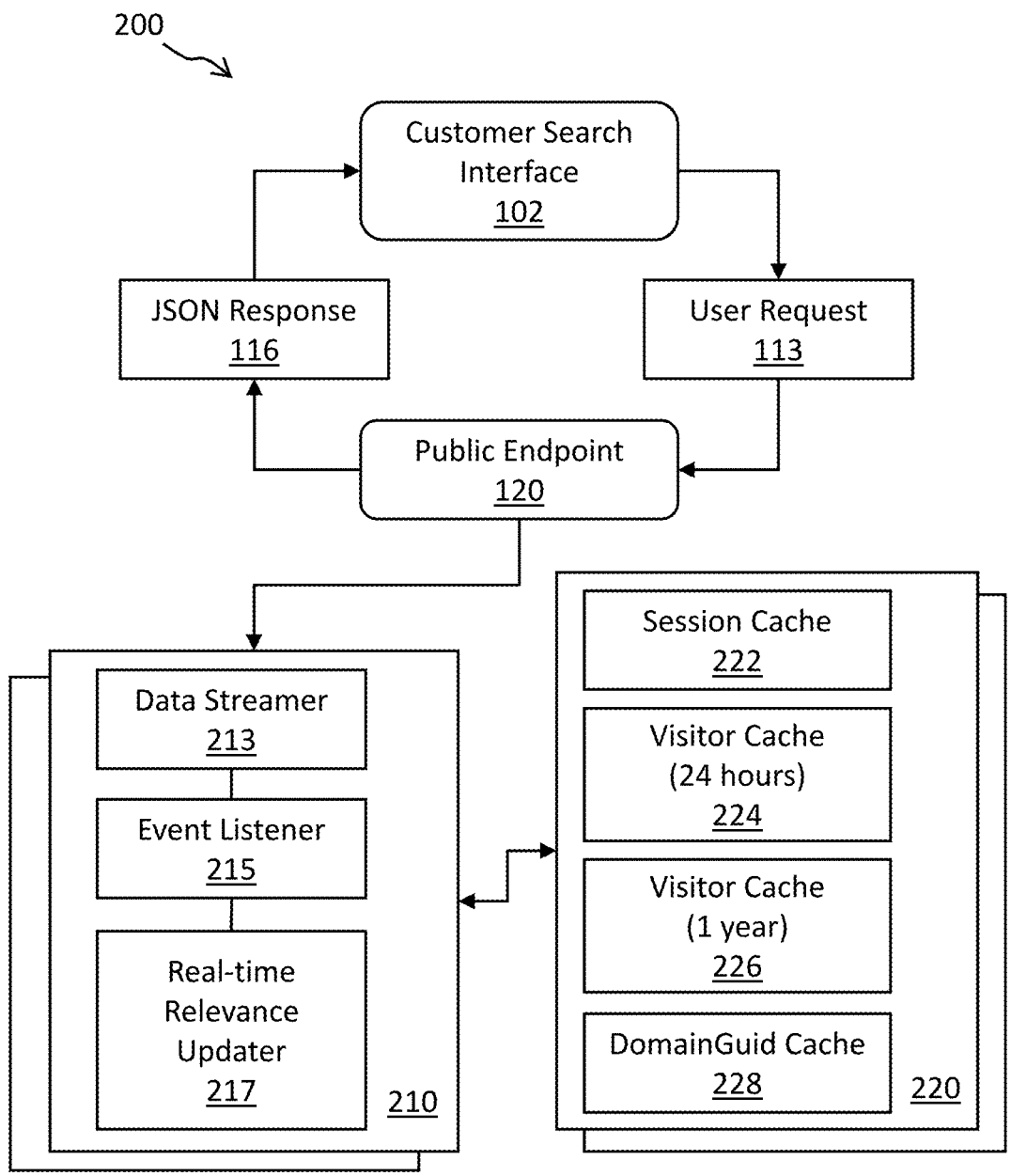
FIG. 2 is a block diagram illustrating an exemplary real-time relevance updating infrastructure in accordance with one or more embodiments of the present disclosure.

FIG. 2 is a block diagram illustrating an exemplary real-time relevance updating infrastructure in accordance with one or more embodiments of the present disclosure. In some embodiments, the real-time relevance updating infrastructure may exemplarily include a data processing unit 210 in communication with both the public endpoint 120 and a data caching unit 220. In some embodiments, the data processing unit 210 may include a data streamer 213, an event listener 215 and a real-time relevance updater 217; and the data caching unit 220 may include a visitor session cache 222, a visitor 24-hour cache 224, a visitor 1-year cache 226 and a Domain Guid cache 228.

In at least some embodiments, the data streamer 213 may be a service designed to handle real-time data steaming at any scale. The data streamer 213 allows users to collect and process large streams of data records in real time. This is useful for the real-time relevance updating applications that require immediate analysis of customer signals.

In at least some embodiments, the event listener 215 may be a function in programming that waits for a specific event to occur and then executes a particular piece of code in response. For example, the event listener 215 may wait for new customer search query and invoke the real-time relevance updater 217 to update the user profile based on the new customer search query.

In at least some embodiments, the real-time relevance updater 217 may dynamically update user profile and customer signals in real-time based on captured customer behaviors, e.g., searches, carted domain names, TLD preferences, to reflect the most current data. The real-time relevance updater 217 allows for immediate adjustments in domain name suggestions based on the customer's evolving intent.

In at least some embodiments, a customer's interactions with the customer search interface 102 during a particular session may be stored in the session cache 222. The visitor 24-hour cache 224 and visitor 1-year cache 226 store the customer's interactions with the customer search interface 102 during a 24 hour period and 1 year period, respectively.

In at least some embodiments, the Domain Guid cache 228 may be a mechanism used by the real-time relevance updating infrastructure to store the globally unique identifiers (GUID) of domains. The cache 228 helps in quickly locating domain controllers without needing to repeatedly query the network, i.e., when a domain controller is needed, the system can refer to the cached GUID instead of performing a fresh look-up.

In at least some embodiments, the data caching unit 220 may be distributed in multiple locations, and the cached objects and time-to-live (TTL) may be updated based on the internet traffic situations. The term, TTL, as used herein refers generally to a duration or lifespan of data before the data is discarded or refreshed.

In at least some embodiments, the customer signals may be processed by dynamic user profiling and real-time updates. In dynamic user profiling, the real-time relevance system constructs a dynamic user profile by comparing long-term data (e.g., up to 1 year from the visitor_guid) with recent activity (e.g., 7 days) and the current session data (visit_guid). This comparison allows the real-time relevance system to understand both the short-term intent and long-term preferences of the customer. The real-time relevance system then analyzes the collected signals, focusing on patterns such as frequently searched TLDs, repeated domain name searches across sessions, and session continuity. Then the real-time relevance system processes the above data to provide personalized domain name suggestions aligned with the customer's behavior and intent. In real time updates, the real-time relevance updates customer profiles and search suggestions within, for instance, 1.5 seconds. As the real-time relevance system continuously monitors the customer's session in real time, the real-time relevance system can dynamically adjust the relevance of domain name suggestions to ensure that the search results evolve as the customer's session progresses.

Figure 3:
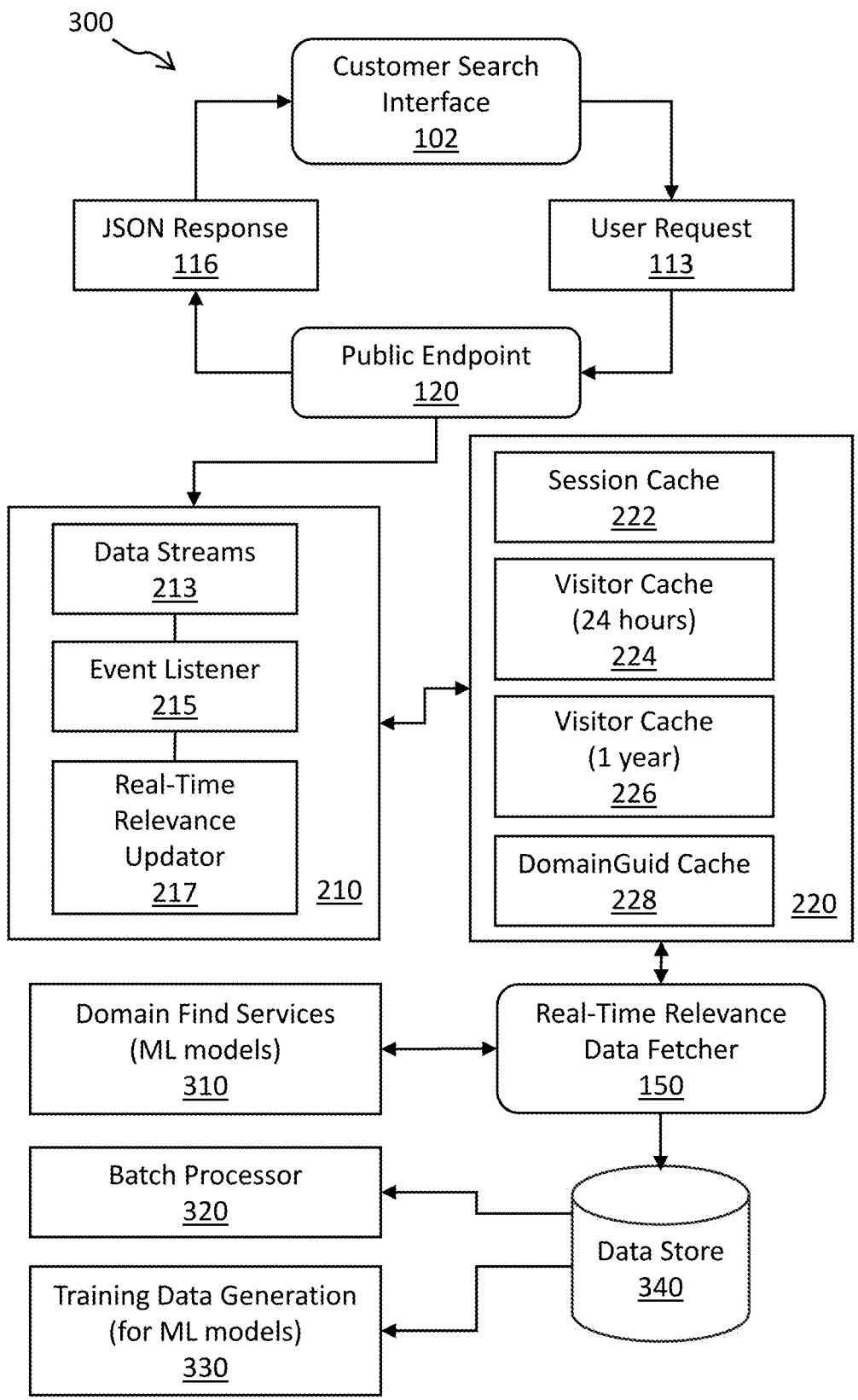
FIG. 3 is a block diagram illustrating an exemplary real-time relevance data retrieval infrastructure in accordance with one or more embodiments of the present disclosure.

FIG. 3 is a block diagram illustrating an exemplary real-time relevance data retrieval infrastructure in accordance with one or more embodiments of the present disclosure. In some embodiments, the data retrieval infrastructure employs the real-time relevance data fetcher 150 to fetch data from the data caching unit 220. The fetched data may include customer signals, user profiles and context information. In some embodiments, the customer signals may include real-time data points, such as search queries, TLD preferences, domain names added to a shopping cart, and user interactions with the customer search interface 102 during a session. The user profiles may be updated with the latest customer signals, incorporating both historical data (e.g., past searches, purchases) and real-time actions to form a comprehensive view of the customer. In some embodiments, the context information may include broader insights, like patterns in customer searches, market trends, and other external data that help the real-time relevance system understand the intent and preferences of the customers in a given session.

In at least some embodiments, the real-time relevance system generates request personalized information based on the customer's real-time behavior, preferences, and historical interactions. The request personalized information contains specific data points that are used to tailor the domain name suggestions. As an example, the request may include such personalized information as customer identifiers and associated search behavior, user profile data and contextual information. In some embodiment, the customer identifiers may include unique identifiers such as visitor_guid, visit-_guid, or shopper_id to track and retrieve the customer's profile from the real-time relevance system. In some embodiments, the search behavior may include information about the customer's ongoing or part searches, such as the tokens (keywords) used, TLD preferences (e.g., .com or .net), domain names searched, and whether domain names were carted or purchased. In some embodiments, the user profile data may include historical behavior such as the customer's search patterns over the past 3 months, purchases, carted domain names, and any preferences for specific domain lengths or price points. In some embodiments, the contextual information may include broader details such as market trends, domain availability, and recent customer actions, which help refine suggestions to be more aligned with the customer's intent.

Once the personalized information is included in the request, in some embodiments, the real-time relevance system may perform following exemplary processes: filtering and ranking domain name suggestions based on the customer's real-time behavior; adjusting the relevance of domain name suggestions by factoring in the user's historical preferences, such as preferred TLDs or price points; and providing a dynamic and personalized experience by ensuring the suggestions are aligned with the customer's current and past behaviors to improve the likelihood of domain name registrations.

In at least some embodiments, the real-time relevance system supports real-time join of data, which refers to a process of combining data from multiple sources as it is being generated or received, allowing for immediate analysis and action. To support the real-time data joins, the real-time relevance system may utilize a distributed in-memory data store that allows for low-latency data access. When a request is received, the real-time relevance system may perform the following steps: function invocation, data lookup, performing the join, aggregation and filtering, and data persistence. In some embodiments, the function invocation step may initiate the real-time data joining process, and the function may act as the central point for orchestrating the real-time join. This function receives the request, identifies the necessary session and visitor data, and pulls it from a cache. In some embodiments, the data lookup step may include pulling different pieces of customer data (e.g., session profiles, visitor profiles) that may be stored across different caches. These data sets might be split by session, visitor, or other parameters, each containing different customer insights. In some embodiments, the performing the join step may be performed once all relevant data sets are retrieved. This joining operation may consolidates session-level data, visitor-level data, and other related cached information, such as search tokens, preferences, and purchase history. The join may be performed in memory for speed, allowing the real-time relevance system to merge the disparate data sets quickly and efficiently. After the data is joined, the aggregation and filtering step may be performed in which the real-time relevance system may recompute, aggregate (e.g., total searches, carted domain names, premium domain name purchased) and filter the data to focus on relevant signals, such as the customer's most recent actions or preferences. In some embodiments, the data persistence is performed by written the enriched data back to the cache, allowing the real-time relevance system to maintain real-time relevance for future requests.

As shown in FIG. 3, in some embodiments, the real-time relevance data fetcher 150 may provide the processed request personalized information to domain find services 310. In at least some embodiments, the domain find services 310 may utilize machine learning (ML) models to provide tools and platforms that help customers search for domain names. The domain find services 310 may also provide tools and platforms that help customers register and manage domain names.

In at least some embodiments, the domain find services 310 outputs a ranked list of domain name suggestions based on a customer's search query. The output may include domain name suggestions and associated availability status, pricing information, and relevance ranking. In some embodiments, the domain name suggestions may be a list of available domain names generated based on the customer's input query and associated real-time customer signals. The real-time relevance system may suggest related domain names, alternative TLDs, or variations of the SLD to give the customers more options. In some embodiments, the availability status may be information on whether the suggested domain names are available for registration, taken, or available through auctions or aftermarket sales. In some embodiments, the pricing information may include a list price, a current price and a renewal price of each suggested domain name, including any premium or discounted pricing. In some embodiments, the relevance ranking may refer to a fact that the suggested domain names may be ranked based on the real-time relevance system's understanding of the customer's intent, preferences, and behavior. Such understanding may include factors like TLD preferences (e.g., .com vs. .net), past purchase history, or session-based interactions with the customer search interface 102.

The real-time relevance system according to embodiments of the present disclosure processes customer queries, applies ranking algorithms, and integrates real-time data from real-time relevance data fetcher 150 to deliver personalized and optimized domain name suggestions, ensuring that the customer receives the most relevant and appealing domain name options.

As shown in FIG. 3, in some embodiments, data generated by the real-time relevance data fetcher 150 may be stored in a data store 340 and then supplied to a batch processor 320 and a training data generation unit 330. In some embodiments, the batch processor 320 may be used to analyze and process historical data (such as a user's profile for the past 180 days and customer purchase profiles) in a more comprehensive and periodic manner. The batch processor 320 may exemplarily perform such functions as data collection, batch processing, post-processing rules, feeding updated information, and real-time integration.

In at least some embodiments, data collection may refer to pulling historic data from the data store 340. The historical data may include details such as customer searches, domain name purchases, cart behavior, and session activities over an extended period (e.g., 180 days).

In at least some embodiments, the batch processing may refer to aggregating, filtering and processing the collected data in batches using, for example, a cloud-based big data platform that can handle large-scale data processing efficiently. A managed service software may be used to orchestrate and schedule the workflow, ensuring that the data is processed at regular intervals.

In at least some embodiments, the post-processing rules may be applied, once the historical data is processed, to refine the user profiles and purchasing patterns. These rules help to clean the data and extract insights such as domain preferences, frequency of premium domain purchases, and price sensitivity.

In at least some embodiments, the feeding updated information may refer to storing the batch-processed insights, such as the aggregated user profiles and updated customer purchase history, in an in-memory data store and cache service. The in-memory caches may be designed to improve the performance of web applications by retrieving data from high-speed, managed in-memory caches instead of relying solely on slower disk-based databases. The in-memory caches may allow the real-time relevance data fetcher 150 to fetch the latest, enriched data in real-time when generating personalized domain name suggestions.

In at least some embodiments, the real-time integration may refer to feeding the updated profile information into the ML models used by the real-time relevance system, ensuring the ML models having the most current and comprehensive view of the customer request when the models perform real-time personalization and ranking.

By leveraging the batch processor 320, in some embodiments, the real-time relevance data fetcher 150 can maintain accurate and updated insights about customers to enhance domain name search personalization.

As shown in FIG. 3, in some embodiments, data generated by the real-time relevance data fetcher 150 and stored in a data store 340 may be supplied to the training data generation unit 330 to generate a training dataset for training the ML models used in the domain find services 310. In some embodiments, the historical customer behavior such as search queries, TLD preferences, domain name purchases, and session interactions may be collected by pulling such information from different data marts of the data store 340 that store aggregated customer data and to be utilized to form a training dataset. The aggregated customer data may include behavior patterns, purchase history, and search trends over extended periods. real-time signals may also be incorporated into the training dataset, ensuring that the model can learn both long-term patterns and immediate customer intent. Such comprehensive dataset may enable the model to provide accurate and personalized domain name recommendations.

FIG. 4 is a flowchart illustrating an exemplary real-time relevance process 400 for domain name recommendation in accordance with one or more embodiments of the present disclosure. The real-time relevance process 400 may exemplarily include exemplary blocks 410-480 as described hereinbelow.

In block 410, the real-time relevance system receives a request for at least one first domain name from a requester with an identification. The requester exemplarily enters the request on the customer search interface 102 shown in FIG. 1.

In block 420, the real-time relevance system fetches requester profile information using the identification, where the requester profile information includes a first cached data collected over a first period (e.g., 7 days) and a second cached data collected over a second period (e.g., 1 year) longer than the first period. The first and second cached data may exemplarily include consumer signals collected over the respective period.

In block 430, the real-time relevance system generates, by executing a first trained machine learning (ML) model exemplarily contained in the domain search tool 140 shown in FIG. 1, at least one seed domain name based at least in part on the request and the requester profile information. In some embodiments, the at least one seed domain name may include the domain requested by the user and some close variations thereof.

In block 440, the real-time relevance system generate a plurality of suggested domain names based on the at least one seed domain name.

In block 450, the real-time relevance system provides the plurality of suggested domain names to the requester for a selection by the requester.

In block 460, the real-time relevance system receives the selection of at least one selected domain name from the plurality of suggested domain names.

In block 470, the real-time relevance system automatically update the first cached data in the requester profile information based at least in part on the request and the selection of the plurality of suggested domain names. The automatic updating ensures that the requester profile information may always reflect the requester's latest activities with the real-time relevance system.

In block 480, the real-time relevance system fetches the updated profile information for generating at least another seed domain name in response to a subsequent request for at least one second domain name.

FIG. 5 is a flowchart illustrating a subset (block 440) of the real-time relevance process 400 shown in FIG. 4 in accordance with one or more embodiments of the present disclosure. Block 440 of FIG. 4 may exemplarily include blocks 510-550 as described hereinbelow.

In block 510, the real-time relevance system generates, by executing a second trained ML model exemplarily contained in the SLD spinner moder 160 shown in FIG. 1, a plurality of SLDs based at least in part on the at least one seed domain name and the requester profile information.

In block 520, the real-time relevance system generates, by executing a third trained ML model exemplarily contained in the TLD spinner model 165 shown in FIG. 1, a plurality of TLDs based at least in part on the at least one seed domain name and the requester profile information.

In block 530, the real-time relevance system generates a first plurality of candidate domain names based on the plurality of SLDs and the plurality of TLDs.

In block 540, the real-time relevance system generates a second plurality of candidate domain names by checking the first plurality of domain names with at least one domain registrar, wherein the second plurality of candidate domain names are currently available domain names among the first plurality of candidate domain names.

In block 550, the real-time relevance system ranks, by executing a fourth trained ML model exemplarily contained in the ranking model 180 shown in FIG. 1, the second plurality of candidate domain names into a recommendation order to form the plurality of suggested domain names for being provided to the requester in block 450 shown in FIG. 4. The recommendation order may be a descending order according to their relevancy to the search query, i.e., the most relevant suggested domain name appears on the top of the order.

Figure 6:
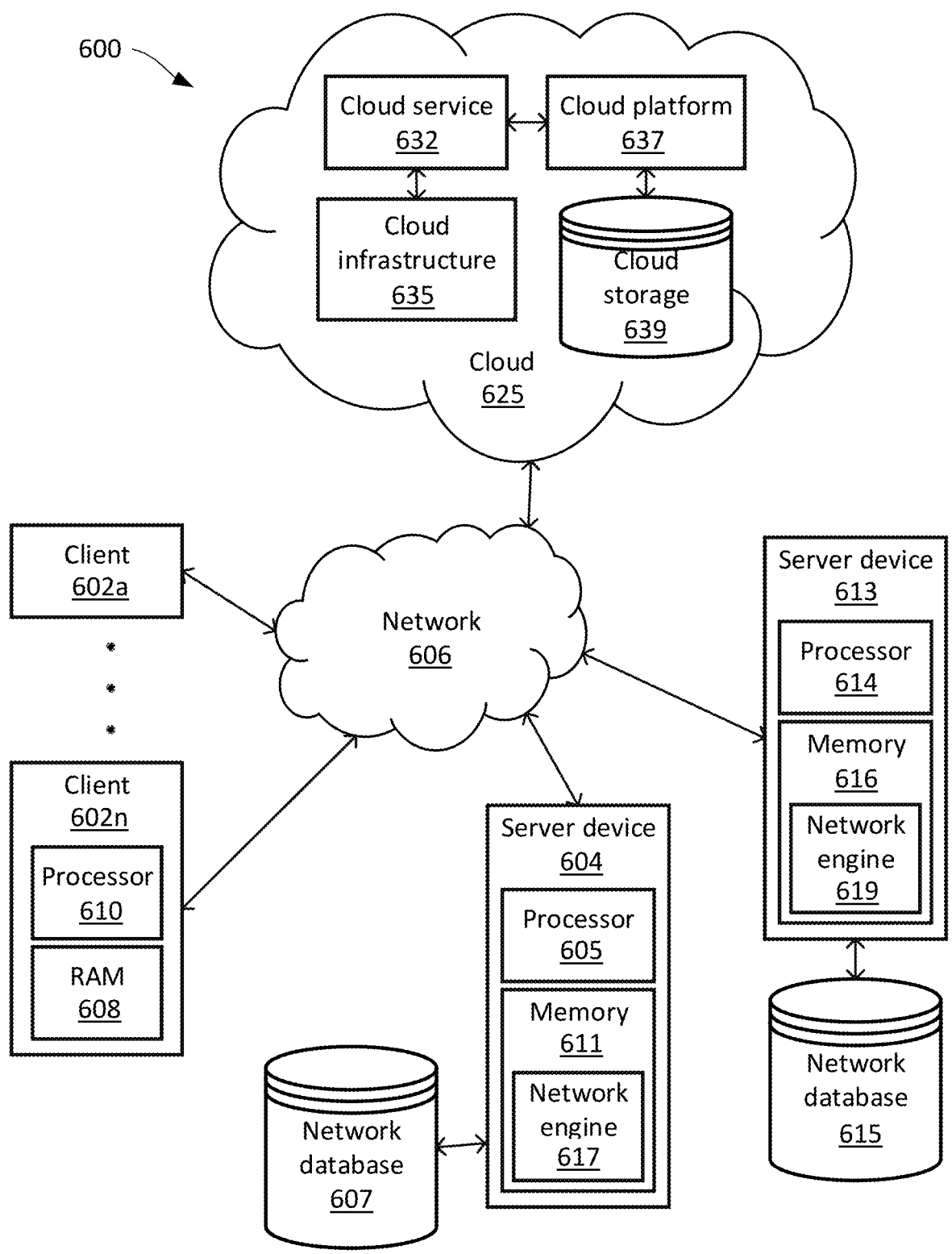
FIG. 6 is a block diagram illustrating an exemplary computer-based system/platform in accordance with one or more embodiments of the present disclosure.

FIG. 6 is a block diagram illustrating an exemplary computer-based system/platform 600 in accordance with one or more embodiments of the present disclosure. However, not all of these components may be required to practice one or more embodiments, and variations in the arrangement and type of the components may be made without departing from the spirit or scope of various embodiments of the present disclosure. In at least some embodiments, client computing devices 602*a* through 602*n* shown each at least includes a computer-readable medium, such as a random-access memory (RAM) 608 coupled to a processor 610 or FLASH memory (not shown) associated thereto. In at least some embodiments, processor 610 may execute computerexecutable program instructions stored in memory 608. In at least some embodiments, processor 610 may include a microprocessor, an ASIC, and/or a state machine. In at least some embodiments, processor 610 may include, or may be in communication with, media, for example computer-readable media, which stores instructions that, when executed by processor 610, may cause processor 610 to perform one or more steps described herein. In at least some embodiments, examples of computer-readable media may include, but are not limited to, an electronic, optical, magnetic, or other storage or transmission device capable of providing a processor, such as the processor 610 of client 602a, with computer-readable instructions. In at least some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In at least some embodiments, the instructions may comprise code from any computer-programming language, including, for example, C, C++, Visual Basic, Java, Python, Perl, JavaScript, and etc.

In at least some embodiments, client computing devices 602a through 602n may also comprise a number of external or internal devices such as a mouse, a CD-ROM, DVD, a physical or virtual keyboard, a display, a speaker, or other input or output devices. In at least some embodiments, examples of client computing devices 602a through 602n (e.g., clients) may be any type of processor-based platforms that are connected to a network 606 such as, without limitation, personal computers, digital assistants, personal digital assistants, smart phones, pagers, digital tablets, laptop computers, Internet appliances, and other processor-based devices. In at least some embodiments, client computing devices 602a through 602n may be specifically programmed with one or more application programs in accordance with one or more principles/methodologies detailed herein. In at least some embodiments, client computing devices 602a through 602n may operate on any operating system capable of supporting a browser or browser-enabled application, such as Microsoft™, Windows™, and/or Linux. In at least some embodiments, client computing devices 602a through 602n shown may include, for example, personal computers executing a browser application program such as Microsoft Corporation's Internet Explorer™, Apple Computer, Inc.'s Safari™, Mozilla Firefox, and/or Opera. In at least some embodiments, through the client computing client devices 602a through 602n, users may communicate over exemplary network 606 with each other and/or with other systems and/or devices coupled to network 606.

As shown in FIG. 6, exemplary server devices 604 and 613 may be also coupled to network 506. Exemplary server device 604 may include a processor 605 coupled to a memory 611 that may store a network engine 617. Exemplary server device 613 may include a processor 614 coupled to a memory 616 that may store a network engine 619. In at least some embodiments, one or more client computing devices 602a through 602n may be mobile clients.

As shown in FIG. 6, exemplary server device 604 may be coupled to an exemplary network database 607; and exemplary server device 613 may be coupled to an exemplary network database 615. In at least some embodiments, exemplary databases 607 and 615 may be any type of database, including a database managed by a database management system (DBMS). In at least some embodiments, an exemplary DBMS-managed database may be specifically programmed as an engine that controls organization, storage, management, and/or retrieval of data in the respective database. In at least some embodiments, the exemplary DBMS-managed database may be specifically programmed to provide the ability to query, backup and replicate, enforce rules, provide security, compute, perform change and access logging, and/or automate optimization. In at least some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In at least some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In at least some embodiments, the exemplary DBMS-managed database may be specifically programmed to include metadata about the data that is stored.

As shown in FIG. 6, network 606 may be coupled to a cloud computing/architecture(s) 625. Cloud computing/architecture(s) 625 may include a cloud service 632 coupled to a cloud infrastructure 635 and a cloud platform 637, where the cloud platform 637 may be coupled to a cloud storage 639.

The computing system can also employ any number of software, firmware, and/or hardware configurations. For example, one or more of the example embodiments disclosed herein can be encoded as a computer program (also referred to as computer software, software applications, computer-readable instructions, and/or computer control logic) on a computer-readable medium.

The term "computer-readable medium," as used herein, can generally refer to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In at least some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment may be implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In at least some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In at least some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) FreeBSD, NetBSD, OpenBSD; (2) Linux; (3) Microsoft Windows; (4) OS X (MacOS); (5) MacOS 11; (6) Solaris; (7) Android; (8) iOS; (9) Embedded Linux; (10) Tizen; (11) WebOS; (12) IBM i; (13) IBM AIX; (14) Binary Runtime Environment for Wireless (BREW); (15) Cocoa (API); (16) Cocoa Touch; (17) Java Platforms; (18) JavaFX; (19) JavaFX Mobile; (20) Microsoft DirectX; (21).NET Framework; (22) Silverlight; (23) Open Web Platform; (24) Oracle Database; (25) Qt; (26) Eclipse Rich Client Platform; (27) SAP NetWeaver; (28) Smartface; and/or (29) Windows Runtime.

In at least some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In at least some embodiments, the exemplary inventive computer-based systems/platforms, the exemplary inventive computer-based devices, and/or the exemplary inventive computer-based components of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTRO, SHA-1, SHA-2, Tiger (TTH), WHIRLPOOL, RNGs).

The aforementioned examples are, of course, illustrative and not restrictive.

As used herein, the term "user" shall have a meaning of at least one user. In at least some embodiments, the terms "user", "subscriber" "consumer" or "customer" should be understood to refer to a user of an application or applications for implementing the functions of the CVCP as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

The aforementioned examples are, of course, illustrative and not restrictive.

In at least some embodiments, the exemplary inventive computer-based systems, the exemplary inventive computer-based devices, and/or the exemplary inventive computer-based components of the present disclosure may be configured to utilize one or more exemplary AI/machine learning techniques chosen from, but not limited to, decision trees, boosting, support-vector machines, neural networks, nearest neighbor algorithms, Naive Bayes, bagging, random forests, and the like. In at least some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In at least some embodiments and, optionally, in combination of any embodiment described above or below, an exemplary implementation of Neural Network may be executed as follows:
  i) Define Neural Network architecture/model,
  ii) Transfer the input data to the exemplary neural network model,
  iii) Train the exemplary model incrementally,
  iv) determine the accuracy for a specific number of timesteps,
  v) apply the exemplary trained model to process the newly-received input data,
  vi) optionally and in parallel, continue to train the exemplary trained model with a predetermined periodicity.

In at least some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In at least some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node may be activated. In at least some embodiments and, optionally, in combination of any embodiment described above or below, the exemplary aggregation function may be a mathematical function that combines (e.g., sum, product, etc.) input signals to the node. In at least some embodiments and, optionally, in combination of any embodiment described above or below, an output of the exemplary aggregation function may be used as input to the exemplary activation function. In at least some embodiments and, optionally, in combination of any embodiment described above or below, the bias may be a constant value or function that may be used by the aggregation function and/or the activation function to make the node more or less likely to be activated.

The aforementioned examples are, of course, illustrative and not restrictive.

At least some aspects of the present disclosure will now be described with reference to the following numbered clauses.

Clause 1. A method, including: receiving, by a computing device, a request for at least one first domain name from a requester with an identification; fetching, by the computing device, requester profile information using the identification, where the requester profile information includes a first cached data aggregated over a first period of time and a second cached data aggregated over a second period of time longer than the first period of time; generating, by the computing device executing a first trained machine learning (ML) model, at least one seed domain name based at least in part on the request and the requester profile information; generating, by the computing device executing a second trained ML model, a plurality of second-level domains (SLDs) based at least in part on the at least one seed domain name and the requester profile information; generating, by the computing device executing a third trained ML model, a plurality of top-level domains (TLDs) based at least in part on the at least one seed domain name and the requester profile information; generating, by the computing device, a first plurality of candidate domain names based on the plurality of SLDs and the plurality of TLDs; generating, by the computing device, a second plurality of candidate domain names by checking the first plurality of domain names with at least one domain registrar, where the second plurality of candidate domain names are currently available domain names among the first plurality of candidate domain names; ranking, by the computing device executing a fourth trained ML model, the second plurality of candidate domain names into a recommendation order to form a ranked plurality of suggested domain names; providing, by the computing device, the ranked plurality of suggested domain names to the requester for a selection by the requester; receiving, by the computing device, the selection of at least one selected domain name selected from the ranked plurality of suggested domain names; automatically updating, by the computing device, the first cached data in the requester profile information based at least in part on the request and the selection; and fetching, by the computing device, the updated profile information for generating at least another seed domain name in response to a subsequent request for at least one second domain name from the requester.

Clause 2. The method of clause 1, where the request includes at least one identifier of the requester.

Clause 3. The method of clause 2, where the request includes at least one real-time customer signal including at least one intent, preference and pattern of the requester interacting with a customer search interface.

Clause 4. The method of clause 3, where the customer signal is obtained through at least one cookie stored in the customer search interface.

Clause 5. The method of clause 1, where the requester profile information includes at least one of: at least one aggregated pattern of search behavior, at least one purchase history listing, and at least one preference of the requester.

Clause 6. The method of clause 1, where the requester profile information includes information from comparison of the first cached data and the second cached data.

Clause 7. The method of clause 1, further including: fetching, by the computing device, context information; and generating, by the computing device executing a first trained ML model, the at least one seed domain name based at least in part on the context information in addition to the request and the requester profile information.

Clause 8. The method of clause 7, where the context information includes information on a continuity of a search session, types of TLDs in a portfolio of the requester and at least one frequently searched TLD.

Clause 9. The method of clause 1, further including generating, by the computing device, training dataset form the requester profile information for training the first ML model.

Clause 10. The method of clause 1, further including joining, by the computing device, data from a distributed in-memory data store to form the requester profile information.

Clause 11. The method of clause 1, further including inserting, by the computing device, at least one advertised domain name in the ranked plurality of suggested domain names.

Clause 12. The method of clause 1, further including providing, by the computing device, price information for ranked plurality of suggested domain names.

Clause 13. The method of clause 1, further including a public endpoint for receiving the request and for providing the ranked plurality of suggested domain names to the requester.

Clause 14. A system, including: at least one processor; and at least one memory storing a plurality of computing instructions configured to instruct the at least one processor to: receive a request for at least one first domain name from a requester with an identification; fetch requester profile information using the identification, where the requester profile information includes a first cached data aggregated over a first period of time and a second cached data aggregated over a second period of time longer than the first period of time; generate, by executing a first trained machine learning (ML) model, at least one seed domain name based at least in part on the request and the requester profile information; generate, by executing a second trained ML model, a plurality of second-level domains (SLDs) based at least in part on the at least one seed domain name and the requester profile information; generate, by executing a third trained ML model, a plurality of top-level domains (TLDs) based at least in part on the at least one seed domain name and the requester profile information; generate a first plurality of candidate domain names based on the plurality of SLDs and the plurality of TLDs; generate a second plurality of candidate domain names by checking the first plurality of domain names with at least one domain registrar, where the second plurality of candidate domain names are currently available domain names among the first plurality of candidate domain names; rank, by executing a fourth trained ML model, the second plurality of candidate domain names into a recommendation order to form a ranked plurality of suggested domain names; provide the ranked plurality of suggested domain names to the requester for a selection by the requester; receive the selection of at least one selected domain name selected from the ranked plurality of suggested domain names; automatically update the first cached data in the requester profile information based at least in part on the request and the selection; and fetch the updated profile information for generating at least another seed domain name in response to a subsequent request for at least one second domain name from the requester.

Clause 15. The system of clause 14, where the request includes at least one identifier of the requester.

Clause 16. The system of clause 15, where the request includes at least one real-time customer signal including at least one intent, preference and pattern of the requester interacting with a customer search interface.

Clause 17. The system of clause 14, where the requester profile information includes at least one of: at least one aggregated patterns of search behavior, at least one purchase history listing and at least one preference of the requester.

Clause 18. The system of clause 14, where the requester profile information includes information from comparison of the first cached data and the second cached data.

Clause 19. The system of clause 14, where the computing instructions are further configured to: fetch context information; and generate, by executing a first trained ML model, the at least one seed domain name based at least in part on the context information in addition to the request and the requester profile information.

Clause 20. The system of clause 19, where the context information includes information on a continuity of a search session, types of TLDs in a portfolio of the requester and at least one frequently searched TLD.

Publications cited throughout this document are hereby incorporated by reference in their entirety. While one or more embodiments of the present disclosure have been described, it may be understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

What is claimed is:
1. A method, comprising:
receiving, by a computing device, a request for at least one first domain name from a requester with an identification;
fetching, by the computing device, requester profile information using the identification, wherein the requester profile information includes a first cached data aggregated over a first period of time and a second cached data aggregated over a second period of time longer than the first period of time;
generating, by the computing device executing a first trained machine learning (ML) model, at least one seed domain name based at least in part on the request and the requester profile information;
generating, by the computing device executing a second trained ML model, a plurality of second-level domains (SLDs) based at least in part on the at least one seed domain name and the requester profile information;
generating, by the computing device executing a third trained ML model, a plurality of top-level domains (TLDs) based at least in part on the at least one seed domain name and the requester profile information;
generating, by the computing device, a first plurality of candidate domain names based on the plurality of SLDs and the plurality of TLDs;
generating, by the computing device, a second plurality of candidate domain names by checking the first plurality of domain names with at least one domain registrar, wherein the second plurality of candidate domain names are currently available domain names among the first plurality of candidate domain names;
ranking, by the computing device executing a fourth trained ML model, the second plurality of candidate domain names into a recommendation order to form a ranked plurality of suggested domain names;
providing, by the computing device, the ranked plurality of suggested domain names to the requester for a selection by the requester;
receiving, by the computing device, the selection of at least one selected domain name selected from the ranked plurality of suggested domain names;
automatically updating, by the computing device, the first cached data in the requester profile information based at least in part on the request and the selection; and
fetching, by the computing device, the updated profile information for generating at least another seed domain name in response to a subsequent request for at least one second domain name from the requester.

2. The method of claim 1, wherein the request comprises at least one identifier of the requester.

3. The method of claim 2, wherein the request comprises at least one real-time customer signal comprising at least one intent, preference and pattern of the requester interacting with a customer search interface.

4. The method of claim 3, wherein the customer signal is obtained through at least one cookie stored in the customer search interface.

5. The method of claim 1, wherein the requester profile information comprises at least one of: at least one aggregated pattern of search behavior, at least one purchase history listing, and at least one preference of the requester.

6. The method of claim 1, wherein the requester profile information comprises information from comparison of the first cached data and the second cached data.

7. The method of claim 1, further comprising:
fetching, by the computing device, context information; and
generating, by the computing device executing a first trained ML model, the at least one seed domain name based at least in part on the context information in addition to the request and the requester profile information.

8. The method of claim 7, wherein the context information comprises information on a continuity of a search session, types of TLDs in a portfolio of the requester and at least one frequently searched TLD.

9. The method of claim 1, further comprising generating, by the computing device, training dataset form the requester profile information for training the first ML model.

10. The method of claim 1, further comprising joining, by the computing device, data from a distributed in-memory data store to form the requester profile information.

11. The method of claim 1, further comprising inserting, by the computing device, at least one advertised domain name in the ranked plurality of suggested domain names.

12. The method of claim 1, further comprising providing, by the computing device, price information for ranked plurality of suggested domain names.

13. The method of claim 1, further comprising a public endpoint for receiving the request and for providing the ranked plurality of suggested domain names to the requester.

14. A system, comprising:
at least one processor; and
at least one memory storing a plurality of computing instructions configured to instruct the at least one processor to:
receive a request for at least one first domain name from a requester with an identification;
fetch requester profile information using the identification, wherein the requester profile information includes a first cached data aggregated over a first period of time and a second cached data aggregated over a second period of time longer than the first period of time;
generate, by executing a first trained machine learning (ML) model, at least one seed domain name based at least in part on the request and the requester profile information;
generate, by executing a second trained ML model, a plurality of second-level domains (SLDs) based at least in part on the at least one seed domain name and the requester profile information;
generate, by executing a third trained ML model, a plurality of top-level domains (TLDs) based at least in part on the at least one seed domain name and the requester profile information;
generate a first plurality of candidate domain names based on the plurality of SLDs and the plurality of TLDs;
generate a second plurality of candidate domain names by checking the first plurality of domain names with at least one domain registrar, wherein the second plurality of candidate domain names are currently available domain names among the first plurality of candidate domain names;
rank, by executing a fourth trained ML model, the second plurality of candidate domain names into a recommendation order to form a ranked plurality of suggested domain names;
provide the ranked plurality of suggested domain names to the requester for a selection by the requester;
receive the selection of at least one selected domain name selected from the ranked plurality of suggested domain names;
automatically update the first cached data in the requester profile information based at least in part on the request and the selection; and
fetch the updated profile information for generating at least another seed domain name in response to a subsequent request for at least one second domain name from the requester.

15. The system of claim 14, wherein the request comprises at least one identifier of the requester.

16. The system of claim 15, wherein the request comprises at least one real-time customer signal comprising at least one intent, preference and pattern of the requester interacting with a customer search interface.

17. The system of claim 14, wherein the requester profile information comprises at least one of: at least one aggregated patterns of search behavior, at least one purchase history listing and at least one preference of the requester.

18. The system of claim 14, wherein the requester profile information comprises information from comparison of the first cached data and the second cached data.

19. The system of claim 14, wherein the computing instructions are further configured to:
fetch context information; and
generate, by executing a first trained ML model, the at least one seed domain name based at least in part on the context information in addition to the request and the requester profile information.

20. The system of claim 19, wherein the context information comprises information on a continuity of a search session, types of TLDs in a portfolio of the requester and at least one frequently searched TLD.

* * * * *